March 24, 1953 S. F. PERRY 2,632,720
METHOD AND APPARATUS FOR COUNTERCURRENT
CONTACTING OF SOLIDS WITH LIQUIDS
Filed Dec. 6, 1947
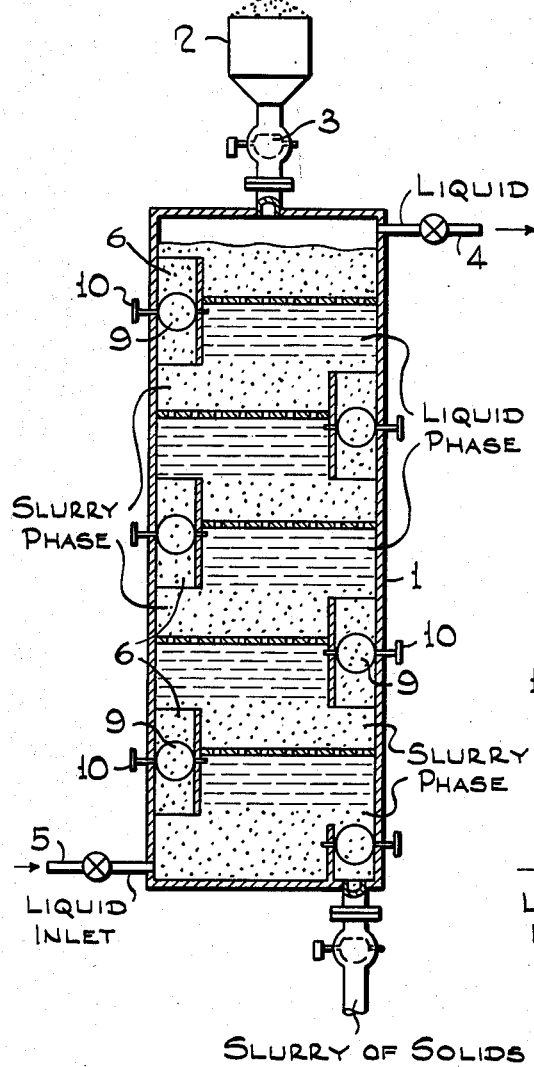
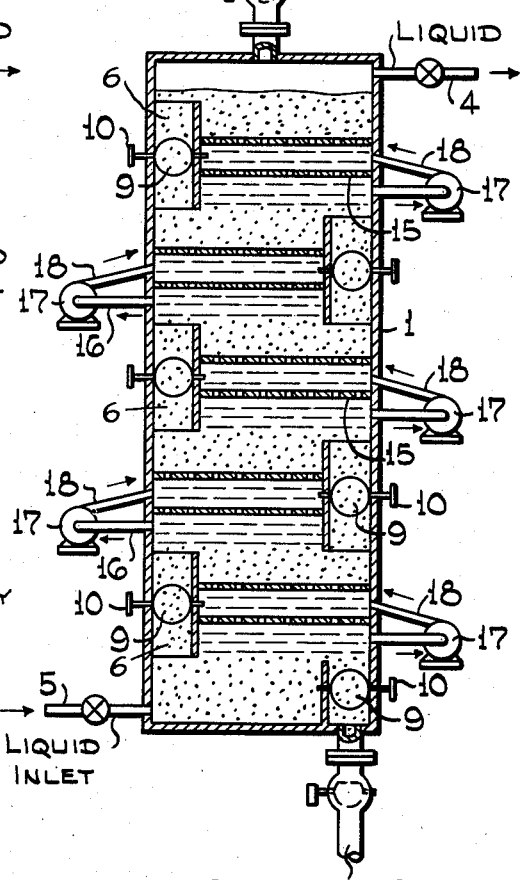
Stephen F. Perry Inventor Patented Mar. 24, 1953

2,632,720

UNITED STATES PATENT OFFICE 2,632,720

METHOD AND APPARATUS FOR COUNTERCURRENT CONTACTING OF SOLIDS WITH LIQUIDS

Stephen F. Perry, Roselle, N. J., assignor to Standard Oil Development Company, a corporation of Delaware Application December 6, 1947, Serial No. 790,190

7 Claims. (Cl. 134—25)

This invention relates to an improved method and apparatus for obtaining continuous countercurrent contact between a powdered or granular solid, and a liquid. In particular the invention concerns a countercurrent treating tower containing a series of pierced plates or bubble cap plates having downcomers from each plate to the plate below it, permitting the flow of a slurry of solid particles through the downcomers, while permitting a flow of liquid upward through the tower.

At the present time numerous processes entail the contacting of liquids with solid particles. A variety of means and apparatus are employed for this purpose. For many applications it is desirable to employ a continuous process, but conventional batch techniques, fixed bed percolation, or mechanical agitation of slurries have generally been used, since mechanical means of continuously handling solid-liquid systems, and particularly for obtaining countercurrent flow, have not been available.

The application of the fluid handling technique previously developed for solid-vapor systems to solid-liquid systems has therefore been investigated. It has been found that when a granular solid of suitable particle size is charged to a vessel in which liquid is flowing upward at less than the free-settling rate of the solid, a "slurry phase" is formed. This phase is turbulent, has a definite interface between it and the clear liquid above it and can be withdrawn through a valve and otherwise handled as a liquid. The concentration of solid in the slurry decreases linearly with increasing upward liquid velocity. The maximum liquid velocity at which a "slurry phase" can be maintained ranges from about 1 to 5 feet per minute, more or less, depending upon the particle size of the solid, the viscosity of the liquid and the difference in density between the solid and the liquid.

Continuous contacting of a solid and a liquid may be accomplished in a tower employing the "slurry phase" principle. In such a tower solid particles, normally fed at the top, drop downwardly under the influence of gravity, countercurrent to the upward flow of liquid being treated. The concentration of solid in the slurry under these conditions is controlled by the velocity of the liquid relative to the solid particles. The slurry may be withdrawn continuously at the bottom, filtered or drained, and the recoverable liquid returned to the system. Countercurrent action is seriously limited, however by backmixing due to the turbulence of the slurry phase. The use of packing or baffles to reduce backmixing is not particularly successful and results in low allowable thruput.

The present invention is directed to the improvement of such a continuous countercurrent process by including in the tower a series of pierced plates, or bubble cap plates. A downcomer is employed to connect each plate to the one below it. Liquid is introduced at the bottom of the tower and solid is introduced at the top of the tower. Liquid velocity upward through the pierced plates or bubble caps is high enough so that flow through them is entirely upward. A fluid slurry level is maintained above each plate allowing overflow of the slurry into the downcomers. The downcomers are so designed as to operate on at least partially settled solid phase or a slurry of relatively high density in order to minimize the downward flow of fluid in association with the solid.

A tower built in accordance with this invention is suitable for handling solid and liquid systems in a wide variety of processes. For example the apparatus may be applied to the treatment of liquids with solid adsorbents, or to the washing and regeneration of the adsorbents, and it may be applied to catalytic or chemical treating and refining operations employing liquid-solid systems.

It is a particular object of my invention to provide a continuous countercurrent contacting method and apparatus for solids and liquids in which backmixing effects are materially reduced, substantially countercurrent flow being obtained.

It is a further object of my invention that a high thruput of solid material is possible.

Other objects and advantages of my invention will become apparent from the following detailed description in connection with the accompanying drawings, in which;

Figure 1 represents an embodiment of my invention diagrammatically illustrating a gravity operated tower and in which;

Figure 2 diagrammatically illustrates a tower in which any desired differential pressure between plates is maintained.

Referring now to Figure 1, a vertical tower 1 is illustrated. The solid particles to be employed are introduced at the top of the tower by means of feed hopper 2, through basket valve 3, star feeder, or any equivalent means for introducing a solid into a liquid system. The liquid to be treated is introduced at the bottom of the tower through line 5, and is withdrawn at the top of the tower through line 4. Positioned in the tower horizontally are a series of perforated plates 5. The perforations of these plates may be somewhat smaller than the particle size of the solids being treated, or alternatively if the perforations are larger than the solids being treated, a small enough number of perforations is placed in each plate so that a sufficiently high liquid velocity is maintained upward through each perforation to prevent the dropping of solids through the perforations. One or more vertical downcomers 6 are provided on each plate extending upwardly but not touching the perforated plate above and extending downwardly to about the level of the uppermost edge of the downcomer placed on the plate beneath. In the normal operation of the embodiment shown in the drawing, the liquid flows upwardly through the perforated plates. Due to the upward liquid velocity, the solid material on each plate is maintained in the form of a fluid slurry, which overflows into the downcomer. By virtue of the fact that liquid is continuously passing upward through the tower, through the slurry held on the perforated plates, the slurry on these plates will be of lower density than the slurry accumulating in the downcomers 6. This gravity differential makes possible the downward flow of solid material in the downcomers, while liquid is flowing upward through the plates.

Special provision must be made when operation of the apparatus is initiated so that excessive flow of liquid up the downcomers will not occur before a slurry phase accumulates to seal the downcomers against liquid flow. This may be accomplished by means of the vanes 9 indicated. These vanes may be rotated to a horizontal position by external rods 10 so that the downcomers are effectively sealed. When a suitable accumulation of solids has occurred in the downcomers, the vanes may then be rotated to a vertical position as in the drawings to permit normal operation of the apparatus.

From the standpoint of gravity differential, it would be desirable to operate with a completely settled solid phase in the downcomers. However, it has been found that the completely settled material acts as a liquid of high viscosity, so that downcomer capacity is very low in a gravity operated tower with this condition. The apparent viscosities of heavy slurries, approaching in density or solid concentration that of the completely settled solid, are much lower, however, providing a suitable region of operability at high capacity. As previously mentioned, the concentration of solid in the slurry is primarily a function of relative velocity of solid and liquid. With proper design of the tower (pressure drop through plates, ratio of downcomer to plate area, length of downcomers, etc.) the desired relative velocities and hence the desired slurry densities on the plates and in the downcomers can be obtained in a gravity operated tower.

A preferred embodiment of my invention is illustrated in Fig. 2. This embodiment is substantially the same as that of Fig. 1, and the components of the apparatus are identified by the same numerals. In the embodiment of Fig. 2, however, solid horizontal partitions 15 extend between the walls of the tower and the downcomers positioned between lines 16 and 18. Draw off line 16, is connected to the space immediately above the slurry level of each plate at the point where clear liquid tends to accumulate. Liquid is withdrawn from this layer of clear liquid through line 16, and pumped by means of pump 17 into the space immediately below the next higher perforated plate through line 18. The pumping pressure supplied by the pumps 17 may be controlled so that the differential pressure from each plate to the next plate above may be adjusted as desired. By this means considerably more elastic operation of the tower may be maintained. By suitably adjusting the differential pressure across the plates by the operation of the pumps, it is possible to cause the downcomers to operate with a slurry of any desired density. Hence the tower may be operated with material in the downcomers of a density substantially equal to that of a completely settled solid phase, or alternatively the slurry may have any desired lower density.

It has been found that using a completely settled phase in a silica gel-lube oil-normal heptane system, a downcomer will operate at the high flow rate of approximately 50,000 lbs., of dry gel per square foot, per hour, under the pressure drop provided by the weight of the gel plus 2 to 4 feet of liquid head, using 40–60 mesh gel and a 1–1 liquid mixture of lube distillate (270 v./100 S. S. U.) with normal heptane. To bring out the advantage of this type of operation over that of a gravity operated tower having completely settled solid phase in the downcomers, the liquid head was counterbalanced to approach the condition existing in a gravity-operated downcomer. It was found that a flow of only about 1300 pounds per square foot per hour was obtained.

The apparatus of this invention is adaptable to the use of solids of a wide range of particle size. It is preferred, however, that the solids be no finer than about 200 mesh. It is also preferred that a reasonably well classified material be employed, and also that the material used be fairly coarse. For example, use of 20–60 mesh solids is particularly desirable in the apparatus of my invention.

While the embodiments of the invention have been described as employing perforated plates it is to be understood that the plates employed may be of the bubble cap tray type. Operation of the tower will be in all respects similar to that described in connection with the perforated plates.

As described, my invention comprises an apparatus for the continuous countercurrent contacting of solid particles with a liquid. A tower is employed having perforated plates, bubble cap trays, or equivalent means for forming bodies of liquid slurry throughout the tower. Downcomers are provided permitting a flow of slurry from each tray to a tray below. Suitable control of the density and flow of slurry through the downcomers is achieved by the design of the downcomers so as to operate by means of gravity, or by employing pressure controlling pumps to connect the liquid phases on successive plates to provide any desired differential pressure across the plates.

Having now fully described this invention, what is claimed is:

1. The method of contacting a liquid with granular solids having a particle size of about 20 to 200 mesh in contiguous superimposed contacting zones separated by perforated partitions which comprises introducing said granular solids into an upper zone and introducing said liquid into a lower zone, thereafter passing said liquid upwardly through successive superimposed zones to the said upper zone, said liquid being introduced to each of said zones at a plurality of points distributed substantially throughout the lower level of each of the zones at an upwardly flowing maximum velocity of about 1 to 5 feet per minute, and said liquid being removed from the said upper zone, maintaining said granular solids in each of said zones as a turbulent slurry phase having an interface surmounted by clear liquid extending substantially throughout each zone, and maintaining said solids in a restricted column extending between adjoining zones as a dense slurry phase preventing any substantial liquid flow through said dense slurry phase, whereby said granular solids flow downwardly through successive zones, and removing said solids from the said lower zone.

2. The process defined by claim 1 in which the said restricted columns of dense slurry are maintained on opposite sides of successive zones whereby said granular solids are passed horizontally through each zone in a line of flow normal to the flow of liquid in each zone.

3. The process defined by claim 1 in which liquid is withdrawn from the upper portion of each zone and is forced into a lower portion of the next higher zone.

4. The method of contacting a liquid with granular solids having a particle size of about 20 to 200 mesh in contiguous superimposed contacting zones separated by perforated partitions which comprises introducing said liquid into a plurality of points distributed substantially throughout the lower level of a lowermost zone, and passing said liquid vertically upwardly through said lowermost zone for introduction into a successively higher zone at a plurality of points distributed throughout the lower level of said successively higher zones at a maximum upward flow velocity of about 1 to 5 feet per minute, and withdrawing said liquid from an upper zone, introducing said granular solids to one side of an upper zone and passing said solids horizontally through said zone in a line normal to liquid flow through said zone to the opposite side of said zone, whereby said granular solids are maintained in said zone as a turbulent slurry having an interface surmounted by clear liquid, forming a column of dense slurry granular solids substantially impervious to liquid passage at said opposite side of said upper zone, said column of dense slurry being in open communication with the next lower zone, passing said solids as a dense slurry phase to successive lower zones and passing said solids horizontally through said successive lower zones to the opposite side thereof in the manner recited, and removing said solids from the lowermost zone.

5. Apparatus for continuously countercurrently contacting solid particles with liquid comprising a vertically elongated vessel, a liquid inlet line at the bottom of the vessel and a liquid drawoff line at the top of the vessel, means for introducing solids to a liquid system at the top of the vessel and means for removing solids from a liquid system at the bottom of the vessel, a plurality of horizontally disposed vertically displaced perforated plates positioned throughout the vessel defining a plurality of treating zones, said perforated plates being adapted to permit the passage of liquids but to prevent the passage of solid particles, at least one conduit extending through each of said perforated plates on one side of the said tower, the conduits of the adjacent plates above and below being positioned at the opposite side of the tower, and the conduits of adjacent pairs of plates extending to substantially the same horizontal level intermediate the plates, and valve means associated with each of said conduits adapted to control passage of solids therethrough.

6. Apparatus for continuously countercurrently contacting solid particles with liquid comprising a vertically elongated vessel, a liquid inlet line at the bottom of the vessel and a liquid drawoff line at the top of the vessel, means for introducing solids to a liquid system at the top of the vessel and means for removing solids from a liquid system at the bottom of the vessel, a plurality of horizontally disposed vertically displaced perforated plates positioned throughout the vessel defining a plurality of treating zones, said perforated plates being adapted to permit the passage of liquids but to prevent the passage of solid particles, at least one conduit extending through each of said perforated plates on one side of the said tower, the conduits of the adjacent plates above and below being positioned at the opposite side of the tower, and the conduits of adjacent pairs of plates extending to substantially the same horizontal level intermediate the plates, and valve means positioned in each of said conduits adapted to control passage of solids therethrough.

7. Apparatus for continuously countercurrently contacting solid particles with liquid comprising a vertically elongated vessel, a liquid inlet line at the bottom of the vessel and a liquid drawoff line at the top of the vessel, means for introducing solids to a liquid system at the top of the vessel and means for removing solids from a liquid system at the bottom of the vessel, a plurality of horizontally disposed vertically displaced perforated plates positioned throughout the vessel defining a plurality of treating zones, said perforated plates being adapted to permit the passage of liquids but to prevent the passage of solid particles, at least one downcomer passing through each of the perforated plates and extending downwardly to a point somewhat above the edge of a next lower downcomer, variable valve means positioned in said downcomers adapted to control passages of solids therethrough, horizontally disposed partitions placed in each of said zones at a point beneath the said perforated plates, drawoff lines placed in each of said zones beneath the said partition, feed lines above each of the said partitions and a pump connected to each of said pairs of drawoff and feed lines, whereby any desired differential pressure may be maintained across said plates.

STEPHEN F. PERRY.

REFERENCES CITED

The following references are of record in the file of this patent:

UNITED STATES PATENTS

| Number | Name | Date |
|---|---|---|
| 1,434,089 | Christensen | Oct. 31, 1922 |
| 1,653,281 | Hess | Dec. 20, 1927 |
| 1,943,822 | Harrington | Jan. 16, 1934 |
| 1,945,114 | Lachman | Jan. 30, 1934 |
| 1,986,257 | Erter | Jan. 1, 1935 |
| 2,009,347 | Sheldon | July 23, 1935 |
| 2,009,510 | Mobley | July 30, 1935 |
| 2,228,434 | Belden | Jan. 14, 1941 |